United States Patent [19]

Johnston

[11] 3,719,746

[45] March 6, 1973

[54] AQUEOUS SYNTHESIS OF IONICALLY CONDUCTIVE COMPOSITIONS OF MATTER

[75] Inventor: William V. Johnston, Camarillo, Calif.

[73] Assignee: North American Rockwell Corporation

[22] Filed: Dec. 8, 1970

[21] Appl. No.: 96,229

[52] U.S. Cl. .................................. 423/463, 252/518
[51] Int. Cl. ......... H01b 1/06, C01b 9/00, C01g 1/06, C01g 3/04, C01g 7/00, C01g 9/04
[58] Field of Search ............. 252/518; 23/87, 89, 367

[56] References Cited

UNITED STATES PATENTS 3,519,404   7/1970   Argue et al............................252/518
2,944,975   7/1960   Folberth................................23/204

OTHER PUBLICATIONS

C. Brink, et al., Acta Crystallegraphica July 1952, Vol. 5, pp. 433–436
Jacobson: Encyclopedia of Chemical Reactions, Vol. VI, 1956, p. 162.

Primary Examiner—George F. Lesmes
Assistant Examiner—J. P. Brammer
Attorney—L. Lee Humphries, Thomas S. MacDonald and Henry Kolin

[57] ABSTRACT

An aqueous process for the preparation of a solid ionically conductive composition of matter having the formula $MAg_4I_5$ in which M is Rb, K, $NH_4$, Cs, or a combination of these, Cs being present only as a minor constituent of M, comprising preparing a substantially saturated solution of MI in water, intimately admixing four molar equivalents of AgI with the MI solution to effect reaction between the MI and AgI, and removing the water to recover $MAg_4I_5$ as the synthesized ionically conductive composition.

9 Claims, No Drawings

1

AQUEOUS SYNTHESIS OF IONICALLY CONDUCTIVE COMPOSITIONS OF MATTER

BACKGROUND OF THE INVENTION

This invention relates to a process for the preparation of ionically conductive compositions of matter having unusually high ionic conductivity. It particularly relates to an aqueous process for the preparation of compounds having the formula $MAg_4I_5$ in which M IS Rb, $NH_4$, K, Cs, or a combination of these, Cs being present only as a minor constituent of M. Such compositions are particularly useful as electrolytes in solid state electric cells. Such compositions are shown and described in U. S. Pat. No. 3,519,404; electric cells containing these electrolyte materials are described in U. S. Pat. No. 3,443,997.

Compositions of the foregoing type, $MAg_4I_5$, as well as certain organic ammonium silver iodide compositions have recently been shown to have ionic conductivity in the solid state over a wide range of temperatures. The known methods of preparing the ionically conductive alkali metal silver iodides involve mixing appropriate amounts of the solid reactants MI and AgI in the desired 1:4 molar ratios, and either heating the mixture until molten, followed by a holding period at a lower temperature to form the desired compound (melt-anneal technique), or reacting the solid reactants in a time-consuming solid state reaction at 200°C or higher to form the compound. In an alternative method of preparation of $MAg_4I_5$, the constituents are dissolved in acetone and precipitated by evaporation. However, this method results in a mixture of the desired compound and another compound, generally a high resistivity compound having the formula $M_2AgI_3$(2 MI:AgI) rather than the pure ionically conductive composition. For preparing the organic silver ammonium iodide conductive compositions, a melt-anneal technique is generally used. A paste preparation technique has also been used in which a slurry or paste is prepared of the silver iodide and the organic ammonium iodide, followed by a multiple annealing technique. Synthesis in an aqueous medium in which the silver iodide and organic ammonium iodide reactants and the formed product exhibit only a limited solubility has also been suggested as feasible.

The present invention provides a simple and convenient method for the preparation of solid ionically conductive alkali metal silver iodides from selected solutions. The process of this invention is advantageous compared with the methods known to the prior art in that it is more easily adapted to large-scale production, does not require the use of a high temperature, and may be used to produce large crystals or thin films of the desired compound.

The compositions prepared by the process of this invention have a high ionic conductivity and may be used in a variety of electrochemical devices. The process is of particular utility for preparing compositions for use in thin-film devices.

SUMMARY OF THE INVENTION

The solid ionically conductive compositions which may be prepared by the process of this invention have the general formula $MAg_4I_5$ in which M is Rb, K, $NH_4$, Cs, or combinations thereof, Cs being present only as a minor constituent of M.

According to the process of this invention, an aqueous essentially saturated solution of MI is prepared. This is prepared conveniently and preferably at room temperature, although any temperature up to the boiling point of the saturated aqueous alkali metal iodide solution may be used. Four molar equivalents of silver iodide are then intimately admixed with this saturated solution to effect the desired reaction. The water is then removed so as to recover the formed $MAg_4I_5$ ionically conductive composition therefrom.

C. Brink et al. in *Acta Cryst.* 5, 433–36, (1952) have described the preparation of the nonconductive compositions $K_2AgI_3$, $Rb_2AgI_3$, and $(NH_4)_2AgI_3$ by saturating a warm concentrated solution of the alkali metal iodide with silver iodide. They found that one mole of KI, RbI, or $NH_4I$ would react with only half a mole of AgI, thereby forming the nonconductive compounds shown.

It has now been discovered that it is feasible to react four molar equivalents of AgI for each molar equivalent of MI present in a saturated aqueous solution of MI so that the reaction that occurs between the silver iodide and the alkali metal iodide results in formation of the desired ionically conductive alkali metal tetrasilver pentaiodide composition as the final product obtained, substantially free of the Brink et al compound. Continuous stirring is preferably employed as the entire calculated amount of silver iodide is gradually added as a fine powder to the saturated aqueous alkali metal iodide solution. Initially, the resulting mixture rapidly thickens, suggesting possible formation of the Brink et al compound as an intermediate. Then, with continued addition of AgI, the mixture begins to thin out to a more fluid paste, suggesting that formation of the desired compound has occurred. While not essential, it is preferable to facilitate the mixing and reaction by warming the solution. Further, by the addition of a slight excess of water or by raising the temperature, a clear amber-colored solution is obtained. After reaction has occurred, as indicated by formation of the paste or of the clear solution, the water present is removed by evaporation at room temperature or by drying in an oven. The process results in the formation of $MAg_4I_5$ and the relative absence of the nonconductive $M_2AgI_3$.

DESCRIPTION OF THE PREFERRED EMBODIMENTS

In the practice of the process of the present invention in its preferred aspects, a minimum amount of water is utilized for dissolving the appropriate amount of the alkali metal iodide, particularly rubidium iodide. While a near-saturated solution may be used initially, depending in part on the reaction temperature, it is preferred to use a saturated solution preferably maintained at a temperature of not less than 40°C, generally between 40° and 100°C. The calculated amount of silver iodide is gradually added as a solid to the solution with constant stirring. Although an apparent initial reaction seems to occur in that the mixture rapidly thickens, it has been found that by continued addition of the silver iodide accompanied by stirring, this thickened solution thins out to a paste as formation of the desired compound occurs.

While the process may be carried out at any suitable temperature, for example, from room temperature to the boiling point of the saturated alkali metal iodide solution, a preferred reaction temperature is above 40°C, generally between 40° and 100°C, and particularly between 40° and 70°C. After reaction occurs, the paste solution or amber-colored solution is evaporated to dryness. The solid which remains is the ionically conductive material $MAg_4I_5$ substantially free from the nonconductive material $M_2AgI_3$. The solid is generally further dried by heating it at a temperature of about 50°–150°C for 0.5 to 5 hours, preferably between 50° and 100°C. By suitable control of the conditions of precipitation and evaporation, thin films or crystals of the ionically conductive compositions may be produced in a relatively simple manner, since removal of the water by evaporation leaves the compound behind.

The following examples serve to illustrate the invention, but are in no way considered limiting thereto:

EXAMPLE 1

A saturated solution of RbI in water is prepared by dissolving 0.44 g. RbI in a minimal quantity of water at room temperature. Silver iodide is gradually added to the solution, and a clear orange-tan liquid results. On further addition of silver iodide, precipitation occurs. Continued addition of silver iodide results in the solution becoming clear. Continued further addition of silver iodide to a total weight of 1.90 g. results in formation of a precipitate. The solution containing the precipitate is warmed to a temperature above 40°C, and a clear orange-tan solution is obtained. Upon evaporation of this solution, a white precipitate remains as residue. This is further dried on a hot plate. X-ray diffraction of the precipitate confirmed that it was $RbAg_4I_5$ and that $Rb_2AgI_3$ was absent. Additional confirmation of the formation of the desired compound was obtained by observing the known solid state transformation temperature of 207°K using differential scanning colorimetry.

EXAMPLE 2

Following the general procedure shown in Example 1, $KAg_4I_5$ is prepared by reacting 0.33 g. KI dissolved in 0.3 g. water with 1.88 g. AgI.

EXAMPLE 3

Following the general procedure shown in Example 1, $NH_4Ag_4I_5$ is prepared by reacting 0.29 g. $NH_4I$ dissolved in 0.3 g. water with 1.88 g. AgI.

It will of course be realized that various modifications can be made in the design and operation of the present invention without departing from the spirit thereof. Thus, while the principle, preferred construction and mode of operation of the invention have been explained and what is now considered to represent its best embodiment has been illustrated and described, it should be understood that within the scope of the appended claims the invention may be practiced otherwise than as specifically illustrated and described.

I claim:

1. A process for preparing an ionically conductive composition of matter of the general formula $MAg_4I_5$ where M is Rb, K, $NH_4$, Cs, or combinations thereof, Cs being present only in combination and as a minor constituent of M, comprising preparing a saturated aqueous solution of MI, intimately admixing four molar equivalents of AgI with said solution to effect reaction between the MI and AgI, and removing the water to recover $MAg_4I_5$ as the synthesized ionically conductive composition.

2. The process according to claim 1 wherein M is potassium.

3. The process according to claim 1 wherein M is rubidium.

4. The process according to claim 1 wherein M is ammonium.

5. The process according to claim 1 wherein the temperature of the reaction is between about 40°C and the boiling point of the solution.

6. The process according to claim 1 wherein the saturated solution of MI is prepared at room temperature, the silver iodide is gradually added to the saturated solution with constant stirring while raising the solution temperature to between about 40°C and the boiling point of the solution, the solution is cooled following reaction to effect precipitation of $MAg_4I_5$, and the water is removed so that the so-prepared $MAg_4I_5$ is thereby recovered.

7. The process according to claim 6 wherein M is potassium.

8. The process according to claim 6 wherein M is rubidium.

9. The process according to claim 6 wherein M is ammonium.

* * * * *